(12) United States Patent
Miranda et al.

(10) Patent No.: US 8,352,604 B2
(45) Date of Patent: Jan. 8, 2013

(54) DISTRIBUTED PROPAGATION OF DATA IN A WIRELESS COMMUNICATION NETWORK

(75) Inventors: Trevor Miranda, San Jose, CA (US); Puneet Batta, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 261 days.

(21) Appl. No.: 12/914,636

(22) Filed: Oct. 28, 2010

(65) Prior Publication Data

US 2012/0110183 A1 May 3, 2012

(51) Int. Cl.
*G06F 15/173* (2006.01)
(52) U.S. Cl. .................................. 709/225; 709/226
(58) Field of Classification Search .......... 709/204–205, 709/217–219, 223–229, 232, 235, 245
See application file for complete search history.

(56) References Cited

U.S. PATENT DOCUMENTS

| | | | |
|---|---|---|---|
| 7,783,777 B1 * | 8/2010 | Pabla et al. ................... | 709/238 |
| 2011/0153802 A1 * | 6/2011 | Steiner et al. ................. | 709/224 |

OTHER PUBLICATIONS

Lindemann, C., et al., "A distributed search service for peer-to-peer file sharing in mobile applications," Peer-to-Peer Computing, 2002. (P2P 2002). Proceedings. Second International Conference on Sep. 5-7, pp. 73-80, 2002.*
International Search Report and Written Opinion for International Application No. PCT/US2011/054231 mailed on Dec. 28, 2011.
Lindemann, C., and Waldhorst, O. P., "A Distributed Search Service for Peer-to-Peer File Sharing in Mobile Applications," Proceedings of the second International Conference on Peer-to-Peer Computing (P2P' 02), Sep. 5, 2002, pp. 8.

* cited by examiner

*Primary Examiner* — Brendan Higa

(57) ABSTRACT

A technique for distributed propagation of data in a wireless communication network includes providing 600 a unique host identifier for each peer network entity in the wireless communication network, each host identifier having a length of B bits. A next step includes requesting 602 data from peer network entities using a request having a host identifier of the requesting network entity. A next step includes, if a peer network entity is hosting the requested data, comparing 608 the host identifiers of the requesting network entity and the peer network entity receiving the request to determine a match. A next step includes responding 610 to the request if a match is determined.

16 Claims, 4 Drawing Sheets

— *PRIOR ART* —

DISTRIBUTED PROPAGATION OF DATA IN A WIRELESS COMMUNICATION NETWORK

FIELD OF THE DISCLOSURE

The present invention relates generally to wireless communication networks, and more particularly to the distributed propagation of data in a wireless communication network.

BACKGROUND

A problem in wireless communication networks, and particularly with a mesh network, is the ability to efficiently distribute data between peers in the network. For example, some subset of the peers in a network may have data, and some other subset of peers in the network may want to get that data. Existing solutions to obtain data include having a centralized server that is queried to distribute that data, or broadcasting the request on the network and having all those peers that are hosting that data respond. The former is not a scalable solution and the latter creates a large amount of network traffic, both of which are not desirable.

Ordinarily, a peer that needs data might broadcast a request for that data to all its other peers to find a peer that is hosting that data. This is not a good solution because if all N peers respond, that may lead to a large increase of network traffic, i.e. a single request could receive N−1 responses. The more peers there are, the more responses are generated, which results in a scalability problem. Similarly, if N−1 peers want a particular data item and only one peer hosts that data, the N−1 requests could generate on the order of $N^2$ responses throughout the network. In other words, if there were 100 peers that wanted data from only one host, there could be upwards of five thousand messages exchanged, in the extreme case. Obviously, having more peers in the network results in an exponential increase in messaging.

When a large number of the network entities involved in a data request are peers, it is desirable to load balance across all peers that can provide that data. When providing the data is an expensive operation (e.g. certificate exchange to verify requestor's identity, cryptographic keys, Diffie-Hellman key exchanges, service location queries, files, etc.) it is desirable to load balance the responses.

Accordingly, there is a need for load balancing the distribution of data among peers in a wireless communication network, such as a mesh network. The load balancing should address the case where there are many hosts for the data, or few hosts for the data.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
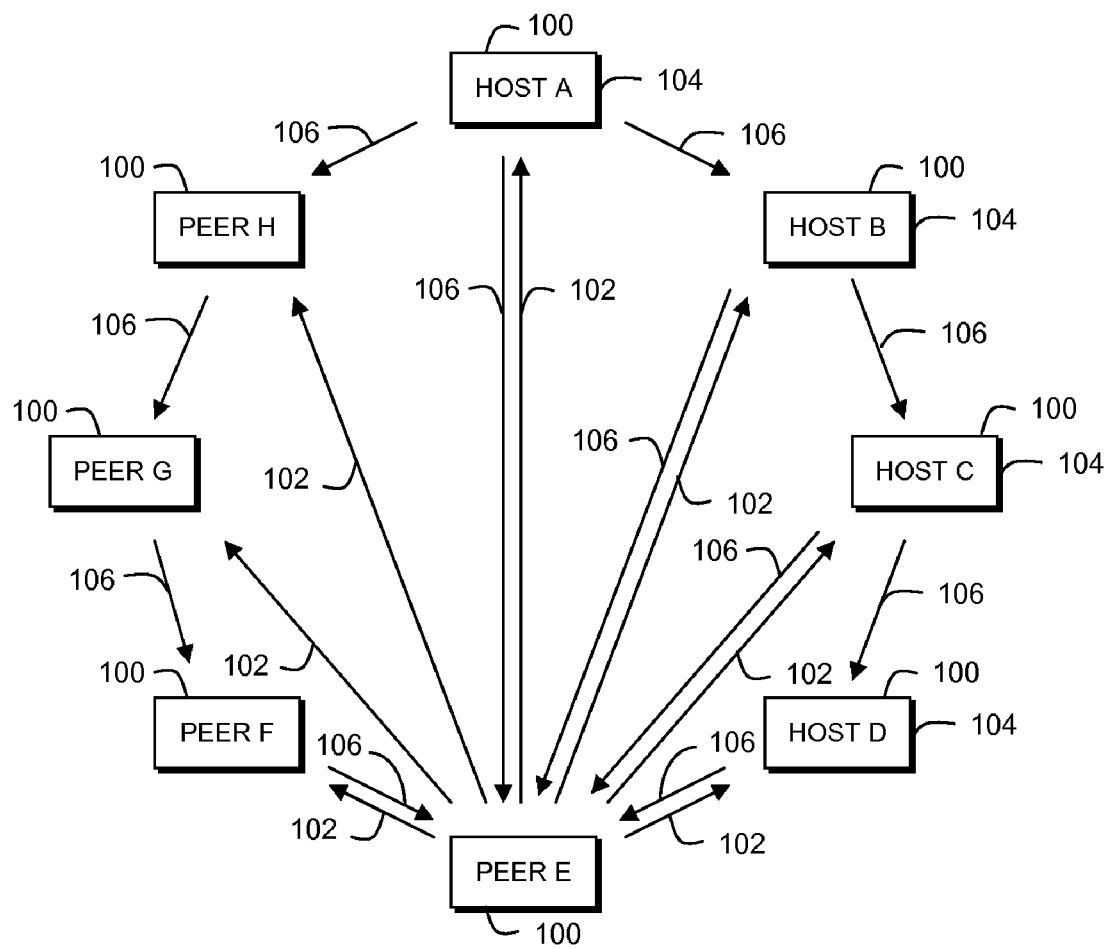
FIG. 1 is a simplified block diagram of a prior art system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A system and method is described that provides load balancing for the distribution of data among peers in a wireless communication network, such as a mesh network. The present invention addresses the case where there are many hosts for the data, or few hosts for the data. In particular, the present invention modifies the request response by using a uniform random host identification that partitions the set of the peers. A peer will respond to the request if it has the requested data and there is a match on a defined subset of the host identification for the requester/requestee. Further, the present invention adds an optimization for the case where few peers host the data, in order to reduce the number of queries required. Specifically, the data is labeled with a generation identifier which increments as it is passed from peer to peer. If the generation identification has a low value and even if the host identifications don't match, a peer may still choose to respond to make the initial propagation of data faster.

FIG. 1 is a block diagram depiction of a prior art wireless communication network. A plurality of peer network entities 100 are shown, which can provide data to each other. The network entities can include one or more of a switch, a router, and even wireless access points, connected in wired and/or wireless configurations. In practice, the network entities 100 can be connected in a wireless mess network 102. Each network entity 100 can be coupled to one or more other network entity 100 in the communication network. Although FIG. 1 shows a configuration where every network entity is coupled to every other network entity, it should be recognized that there may be configurations where one network entity can only contact another network entity through one or more intermediary network entities.

Data can be downloaded from any host peer network entity upon receiving an originating request from any other network entity. The protocols and messaging needed to accomplish a data transfer session, are known in the art, and will not be presented here for the sake of brevity. In addition, the protocols and messaging needed to establish a mesh network are also known in the art and will not be presented here for the sake of brevity.

The wireless communication network can include local and wide-area networks, or other IEEE 802.11 wireless communication system. However, it should be recognized that the present invention is also applicable to other wired or wireless communication systems. For example, the description that follows can apply to one or more communication networks that are IEEE 802.xx-based, employing wireless technologies such as IEEE's 802.11, 802.16, or 802.20, modified to implement embodiments of the present invention.

Referring back to FIG. 1, in this example one of the peer network entities, Peer E, requires data. Peer E, sends a data request 102, such as through a broadcast message for example, to all the other network entities in the communication network. The broadcast can be received directly by other peers (as shown) or propagated through intermediary entities (not shown). In this example, peer network entities F-H do not have copies of the requested data and do not respond to the request 102. However, Peer network entities A-D 104 do host copies of this data, and each host 104 sends a response 106 back to Peer E indicating that they are a host for this data. The response 106 can be sent directly if possible, or can be transferred through intermediary entities. For example, instead of a direct response Host A could send a response 106 through Peers H, G, F, or through Peers B, C, D, even if those peers already have copies of the data. Afterwards, Peer E can contact anyone of the Hosts (A-D) to retrieve the required data. As can be seen, there is a great amount of messaging overhead involved in the transfer of data from one entity to another. Having more peers that host data will result in more responses. In addition, having more peers that are requesting data will result in even more requests 102 and responses 106.

Figure 2:
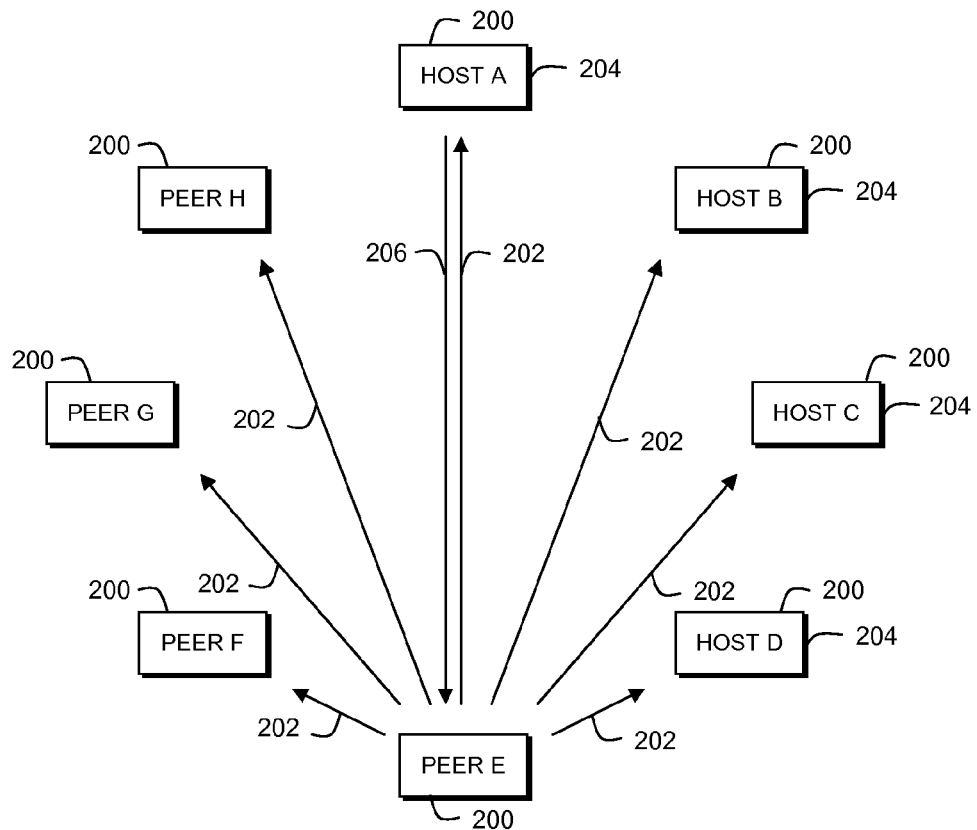
FIG. 2 is a simplified block diagram of a system, in accordance with some embodiments of the present invention.

Referring to FIG. 2, there is shown a block diagram of network entities adapted to support the inventive concepts of the embodiments of the present invention. Those skilled in the art will recognize that FIG. 2 does not depict all of the equipment necessary for system to operate but only those system components and logical entities particularly relevant to the description of embodiments herein. For example, servers, routers, switches, and access points can all includes separate processors, communication interfaces, transceivers, memories, etc. In general, components such as processors, transceivers, memories, and interfaces are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

The present invention provides an apparatus for distributed propagation of data in a wireless communication network. In accordance with the present invention, every peer network entity in the communication network starts up with a host identifier. The host identifier is derived from either a random number, or a function of one of the network entity's properties (e.g. Media Access Control (MAC) address or Internet Protocol (IP) address) that is known to produce close to a uniform distribution of values. For example, if there are a large number of entities, approximately half of the entities should have the most significant bit (MSB) in their MAC or IP address set to 1 and half set to 0. Therefore, if the host identifier is chosen to have a length, B, of one bit, this bit can be set to the MSB of the MAC or IP address, unless a random number was used to generate the host identifier. Further, approximately a quarter of all the network entities each will have the first two MSBs set to either 00, 01, 10 or 11. Therefore, if the host identifier is chosen to have a length, B, of two bits, these two bits can be set to the first two MSBs of the MAC or IP address, unless a random number was used to generate the host identifier. A perfectly uniform distribution of host identifiers is not essential, but the performance of the present invention improves with a uniform distribution of host identifiers. Choosing how many bits, B, are in the host identifier is a tradeoff between the speed of distribution of the data across the network and the load on the network due to the number of entities and the multiple responses to queries, and can be determined empirically. Preferably, the host identifier in each network entity is regenerated periodically to change the distribution among the network entities over time.

When a network entity wishes to query its peers in the communication network for particular data, the network entity will send a series of request messages to its peer network entities in the communication network, until it receives a response. Each request contains the host identifier of the requesting entity (300 in FIG. 3) and a request number, Q, (302 in FIG. 3) which starts from zero and increments after every request for the same response that goes unanswered. When a host sees a request on the network for which it possesses (hosts) the requested data, it compares the first (B−Q) bits of the requestor's host identifier 300, with the first (B−Q) bits of its own host identifier. If it is determined that these bits match, the host (e.g. Host A) responds to the request with an offer to provide the data.

Referring to FIG. 2, it is assumed that the host identifier has two bits (B=2). In this example, the host identifiers as assigned as shown in Table 1.

TABLE 1

| Host Identifier Assignments | |
|---|---|
| Peer A | 00 |
| Peer B | 01 |
| Peer C | 10 |
| Peer D | 11 |
| Peer E | 00 |
| Peer F | 01 |
| Peer G | 10 |
| Peer H | 11 |

Figure 3:
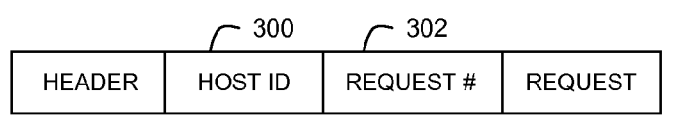
FIG. 3 shows a block diagram of a request message, in accordance with the present invention.

A network entity 200 (e.g. Peer E) requiring data broadcasts a first request message 202 with its two-bit host identifier of "00" (300 in FIG. 3). The first request 200 (Q=0) could be responded to by those peer network entities that host the data and that have the same (B−Q=2−0) two bits of the host identifier, i.e. only approximately one-fourth of the available peers. There are four entities 204 that host the required data. In this example, Peer A actually hosts the data and has the same host identifier "00" and can respond 206 with a response that it has the data (or can respond with the data itself). This response 206 can be direct (as shown) or through intermediary peers if a direct connection does not exist. Unlike, the prior example of FIG. 1, only Host A will respond, even though other peers 204 also host the data. As a result, the present invention has reduced the messaging overhead over that of FIG. 1.

Figure 4:
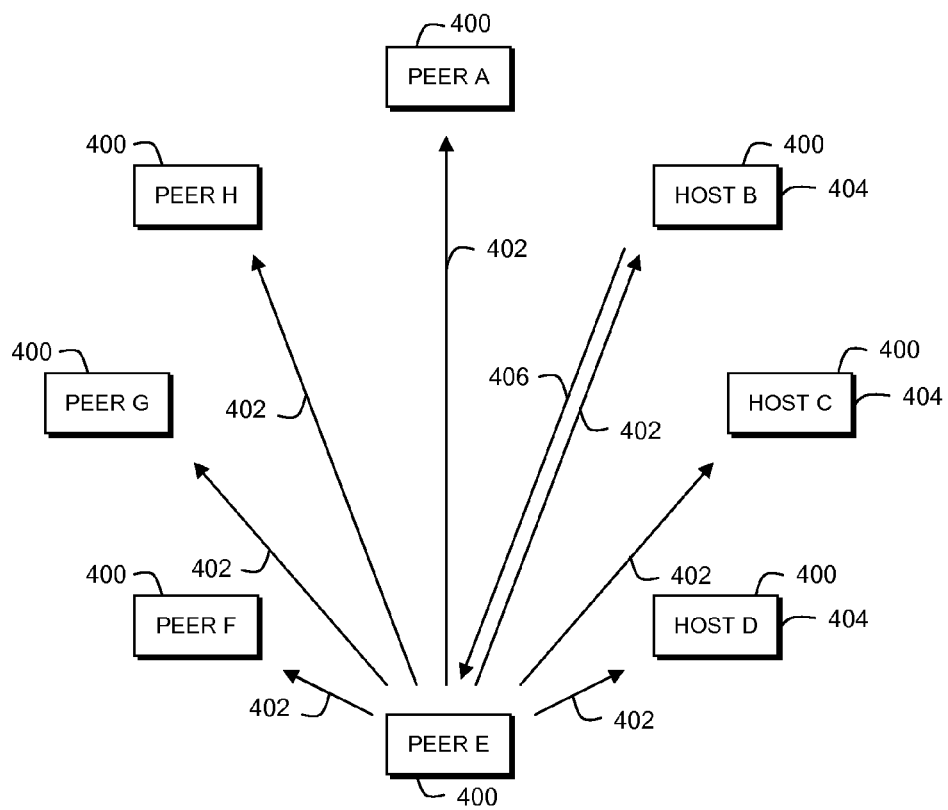
FIG. 4 is a simplified block diagram of a system, in accordance with other embodiments of the present invention.

Referring to FIG. 4, if it is assumed that Peer A does not host the required data. The first request message (202 of FIG. 2) will result in no responses, and Peer E will then send a second request message 402 with the request number incremented by one (Q=1). The request number truncates the host identifier (removing either the first bit or the last bit). In this example, it is assumed that the last bit is truncated. On the second request, those peer network entities that have the same (B−Q=2−1) remaining bit of the host identifier, i.e. one-half of the available peers, could respond. In this example, there are three entities 404 that host the required data. In this example, Peer B actually hosts the data and has the same truncated host identifier "0" as the requesting Peer E, and can respond 406 that it has the data. This response 406 can be direct (as shown) or through intermediary peers if a direct connection does not exist. Unlike, the prior example of FIG. 1, only Host B will respond, even though other peers 404 also host the data. As a result, the present invention still reduces the messaging overhead over that of FIG. 1.

On the third request (B−Q=0), the host identifier comparison is null for all entities and all of the available peers could respond, which reverts to the prior art case of FIG. 1. As can be seen, a network entity needs to send at most B+1 requests, at the end of which its host identifier will create a match on all other peers. However, if the requesting network entity is successfully able to find a host in its earliest succession of requests, the present invention is able to use less communication overhead than the prior art. In effect, the repeated succession of requests from a network entity serves to contact an ever expanding sphere of peers in the network. As the number of peers approaches $2^B$, it is likely that each request matches one host on the first request. However, when the number of hosts that possess the requested data is low, it is likely it will take up to B+1 requests to generate a response.

Figure 5:
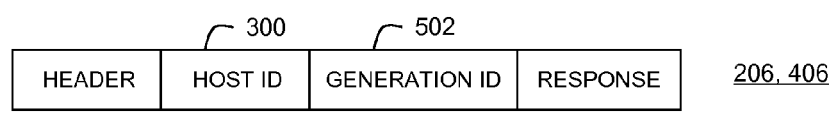
FIG. 5 shows a block diagram of a response message, in accordance with the present invention.
Figure 6:
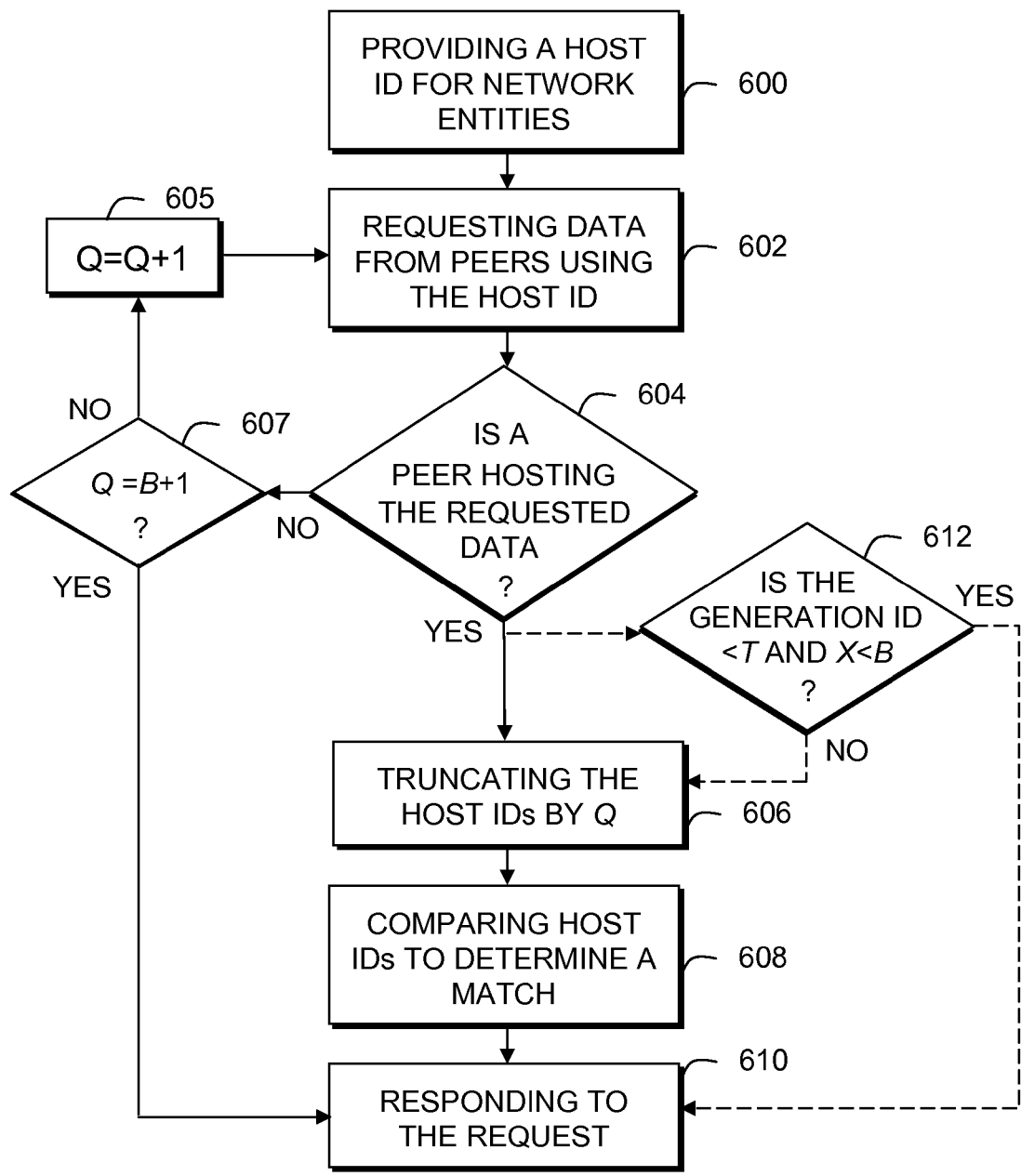
FIG. 6 is a flowchart of a method, in accordance with the present invention.

To alleviate the problem where few peers host the requested data, the present invention provides an optimization is to associate data that a host possesses with a generation identifier, 502 referring to FIG. 5. The generation identifier defines how many network entities have passed down the data from a source, i.e. how old the data is. A host that generates particular data or obtains it from primary source (not by the process of querying the network by the process described above) will set a generation identifier of '1' for that data. Whenever a host receives data in a response 206, 406 from another host that already has a generation identifier, N, that host will set its own generation identifier for that resource to N+1. In accordance with the present invention, all hosts with a generation identifier below a threshold T always respond 206, 406 to the first X number of requests regardless of whether the host identifier bits match according to the process described above. The response 206, 406 includes the generation identifier of the data. In this way, originating sources will propagate original data throughout the communication network faster (in a tree-like distribution pattern) than if the data is handed down through a linear sequence of peers.

The value of T and X must be kept small compared to B, and can be determined empirically in order to improve the distribution of data in the communication network. In this way the data initially spreads rapidly, and the responses according to the scheme above distribute the data, and subsequently the messaging load, more evenly and ensures fewer than B queries are required to get a response.

FIG. 5 illustrates a flowchart of a method for distributed propagation of data in a wireless communication network, in accordance with the present invention. The method includes providing 600 a unique host identifier for peer network entities in the wireless communication network, each host identifier having a length of B bits. Preferably, the bits in the host identifiers of all the network entities in the communication network have a substantially uniform distribution. In addition, the host identifier in each network entity can be regenerated periodically to change the distribution among the network entities over time. In one embodiment, this step includes providing a generation identifier for data.

A next step includes requesting 602 data from peer network entities using a request having a host identifier of the requesting network entity. If no response is received to the request (i.e. there is no peer hosting the data that has the same host identifier as the requesting network entity), this step can be repeated 605 a number of times, Q, up to B+1. For repeated requests, the present invention includes truncating (606) the length of the host identifiers by one bit for each subsequent repeat, Q, of the request. If Q=B+1 607, then a match is automatically determined, and the method proceeds direct to the response 610.

A next step includes, if a peer network entity is hosting the requested data 604, comparing 608 the host identifiers of the requesting network entity and the peer network entity receiving the request to determine a match.

A next step includes responding 610 to the request if a match is determined Optionally, where a generation identifier is being used, this step includes 612 those network entities hosting data with a generation identifier below a threshold T always responding to the first X number of requests regardless of whether the host identifier bits match. Preferably, T and X are chosen less than B.

Advantageously, the system and method described herein enables load balancing for the distribution of data among peers in a mesh network. The system and method also addresses the case where there are many hosts for the data, or few hosts for the data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for distributed propagation of data in a wireless communication network, the method comprising:
providing a unique host identifier for peer network entities in the wireless communication network, each host identifier having a length of B bits;
requesting data from peer network entities using a request having a host identifier of the requesting network entity;
if a peer network entity is hosting the requested data, comparing the host identifiers of the requesting network entity and the peer network entity receiving the request to determine a match; and
responding to the request if a match is determined.

2. The method of claim 1, wherein the requesting step is repeated a number of times, Q, up to B+1, and further comprising truncating the length of the host identifiers by one bit for each subsequent repeat, Q, of the request.

3. The method of claim 2, wherein if Q=B+1, then a match is automatically determined.

4. The method of claim 1, wherein the bits in the host identifiers of all the network entities in the communication network have a substantially uniform distribution.

5. The method of claim 1, wherein the host identifier in each network entity is regenerated periodically to change the distribution among the network entities over time.

6. The method of claim 2, wherein providing includes providing a generation identifier for data, and wherein responding includes those network entities hosting data with a generation identifier below a threshold T always respond to the first X number of requests regardless of whether the host identifier bits match.

7. The method of claim 6, wherein T and X are less than B.

8. A method for distributed propagation of data in a wireless communication network, the method comprising:
providing a unique host identifier for each peer network entity in the wireless communication network, each host identifier having a length of B bits;
requesting data from peer network entities using a request having a host identifier of the requesting network entity, wherein this step is repeated a number of times, Q, up B+1;
if a peer network entity is hosting the requested data, truncating the length of the host identifiers of the requesting and peer network entities by one bit for each subsequent repeat, Q, of the request, and comparing the host identifiers of the requesting network entity and the peer network entity receiving the request to determine a match; and
responding to the request if a match is determined.

9. A network entity for distributed propagation of data in a wireless communication network, the network entity comprising:
a transceiver; and
a processor coupled to the transceiver, the processor operable to provide a unique host identifier having a length of B bits for the network entity, receive a request for data from a requesting network entity where the request includes a host identifier of the requesting network entity, wherein if the network entity is hosting the requested data, the processor is operable to compare the host identifier of the network entity with that of the requesting network entity to determine a match, and if a match is determined the processor directs the transceiver to respond to the request.

10. The entity of claim 9, wherein the entity is a wireless switch.

11. The entity of claim 9, wherein the transceiver receives requests that are repeated a number of times, Q, up B+1, and wherein the processor truncates the length of the host identifiers by one bit for each subsequent repeat, Q, of the request.

12. The entity of claim 9, wherein if Q=B+1, then a match is automatically determined by the processor.

13. The entity of claim 9, wherein the bits in the host identifiers of all the network entities in the communication network have a substantially uniform distribution.

14. The entity of claim 9, wherein the host identifier in the network entity is regenerated periodically to change the distribution among the network entities in the communication network over time.

15. The entity of claim 11, wherein the processor is operable to provide a generation identifier for hosted data, and wherein the processor directs the transceiver to respond to the first X number of requests if the generation identifier is below a threshold T, regardless of whether the host identifier bits match.

16. The entity of claim 15, wherein T and X are less than B.

* * * * *

UNITED STATES PATENT AND TRADEMARK OFFICE
CERTIFICATE OF CORRECTION

PATENT NO. : 8,352,604 B2
APPLICATION NO. : 12/914636
DATED : January 8, 2013
INVENTOR(S) : Miranda et al.

It is certified that error appears in the above-identified patent and that said Letters Patent is hereby corrected as shown below:

In the Specifications:

In Column 6, Line 21, delete "determined" and insert -- determined. --, therefor.

In the Claims:

In Column 8, Line 32, in Claim 8, delete "up" and insert -- up to --, therefor.

In Column 8, Line 60, in Claim 11, delete "up" and insert -- up to --, therefor.

Signed and Sealed this
Fourth Day of June, 2013

Teresa Stanek Rea
*Acting Director of the United States Patent and Trademark Office*